United States Patent
Montgomery et al.

[11] Patent Number: 6,094,785
[45] Date of Patent: *Aug. 1, 2000

[54] SNAP APPARATUS FOR HOUSINGS

[75] Inventors: Daniel Douglas Montgomery, Wildwood; Leonardo Diego Moral, Chicago, both of Ill.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/884,872

[22] Filed: Jun. 30, 1997

[51] Int. Cl.[7] .............................. A44B 17/00; B23P 19/00
[52] U.S. Cl. .............................. 24/324; 24/108; 24/662; 24/297; 29/426.6; 29/453; 29/764; 361/752; 361/814; 455/128; 455/90
[58] Field of Search .............................. 29/453, 764, 235, 29/426.6; 24/108, 662, 297, 324; 361/752, 814; 455/128, 90

[56] References Cited

U.S. PATENT DOCUMENTS

| | | | |
|---|---|---|---|
| 303,731 | 8/1884 | Heller | 24/297 |
| 426,999 | 4/1890 | Lewis | 24/297 |
| 434,802 | 8/1890 | Perry | 24/297 |
| 488,219 | 12/1892 | Platt | 24/297 |
| 531,701 | 1/1895 | Smith | 24/297 |
| 1,014,148 | 1/1912 | Heller | 24/297 |
| 2,538,396 | 1/1951 | Sutin | 24/297 |
| 3,380,141 | 4/1968 | Rofer | 29/453 |
| 3,530,750 | 9/1970 | Daniels | 83/141 |
| 3,541,661 | 11/1970 | Nava | 29/453 |
| 3,750,890 | 8/1973 | Smith et al. | 211/75 |
| 3,881,276 | 5/1975 | Kosicki et al. | 29/453 |
| 4,636,915 | 1/1987 | Perkins et al. | 24/297 |
| 4,864,721 | 9/1989 | Rudy, Jr. et al. | 29/453 |
| 4,912,602 | 3/1990 | Zurek et al. | |
| 5,078,625 | 1/1992 | Anzai | 439/699 |
| 5,131,711 | 7/1992 | Laferle | 24/297 |
| 5,591,938 | 1/1997 | Navazo | 24/324 |

FOREIGN PATENT DOCUMENTS

| | | | |
|---|---|---|---|
| 1107029 | 5/1961 | Germany | 24/73 |
| 12113 | 6/1895 | United Kingdom | 24/108 |
| 606591 | 8/1948 | United Kingdom | 24/108 |

*Primary Examiner*—David P. Bryant
*Attorney, Agent, or Firm*—John J. King; Michael C. Soldner

[57] ABSTRACT

The present invention relates to a snap arrangement comprising snap hooks (208) associated with a first housing (200) that snap over corresponding protrusions (111) in a second housing (100). The snap hooks preferably include an inclined portion (212) such that a finger (504) of a certain width of a removal tool (502) will force them apart to the deflection required for disassembly. Once the tool has been inserted beyond the elbow (213), the snap hook is not deflected any further regardless of the motion of the tool. This enables the tool to continue moving the front housing apart from the rear housing without further deflecting the snap hooks. This ensures that the snap hooks are never overstressed, that the front housing comes completely off of the rear housing every time, and that repeated disassembly will only minimally affect the strength of the snaps.

4 Claims, 6 Drawing Sheets

SNAP APPARATUS FOR HOUSINGS

FIELD OF THE INVENTION

The present invention relates to housing assemblies, and more particularly to a snap assembly and a method for assembling and disassembling housings.

BACKGROUND OF THE INVENTION

Consumer product devices, such as a cellular telephones or other wireless communication devices, often are returned for repair or analysis. Some repair may require that the plastic housings are removed to access the internal circuitry of the device. The housings are often assembled using snaps. Aside from cosmetically damaging the housing during disassembly, snaps can also be damaged, putting the reliability of the device in the field in question. Also, disassembly of the housings can be tedious and time-consuming. In contrast, snaps which are designed for easy removal can often be less tamper resistant, allowing unauthorized or unqualified individuals to access the internal circuitry of the device.

Accordingly, there is a need for a snap apparatus and method for disassembling housings.

There is a further need for a snap apparatus which minimizes damage to the snaps during disassembly.

There is a further need for a snap apparatus and method for disassembling housings easily by authorized individuals, while maintaining the tamper-resistance to restrict access by unauthorized individuals to the internal circuitry of the device.

DESCRIPTION OF THE PREFERRED EMBODIMENT

The present disclosure relates to a snap arrangement for a front and rear housing of a device. The rear housing preferably has six sets of two opposing snap hooks that snap over a corresponding protrusion in the front housing side walls. The shape of the snap hooks is such that a pin or a finger of a certain width of a removal tool will force them apart to the deflection required for disassembly. The finger, having disengaged the snaps, can also be used to move and push the front housing apart from the rear. Also, additional snaps on a rear wall are designed preferably to be on the front housing, allowing a disassembly fixture to release these snaps according to the present invention.

The snap apparatus shown in the present disclosure allows a removal tool, such as the "U" shaped tool as shown, to disengage the front housing from the rear housing without damaging either housing. As the tool is being inserted into the opening in the rear housing, it deflects the opposing snaps apart. The amount of deflection is determined by the width of the tool and the angle of the snap arm. Once the full width of the tool has been inserted, the snaps are not deflected any further regardless of the motion of the tool. This enables the tool to continue moving the front housing apart from the rear without further deflecting the snap hooks. This ensures that the snap hooks are never overstressed, that the front housing comes completely off of the rear housing every time, and that repeated disassembly will only minimally affect the strength of the snaps.

The snaps on the rear wall are designed so that insertion onto a disassembly fixture automatically disengages them, allowing the front to come freely off of the rear. That is, the snaps on a rear wall are designed preferably to be on the front housing, allowing a disassembly fixture to release these snaps according to the present invention. The method and apparatus of the present disclosure allows repair personnel to easily and reliably disassemble the device without damaging the parts in any way.

Figure 1:
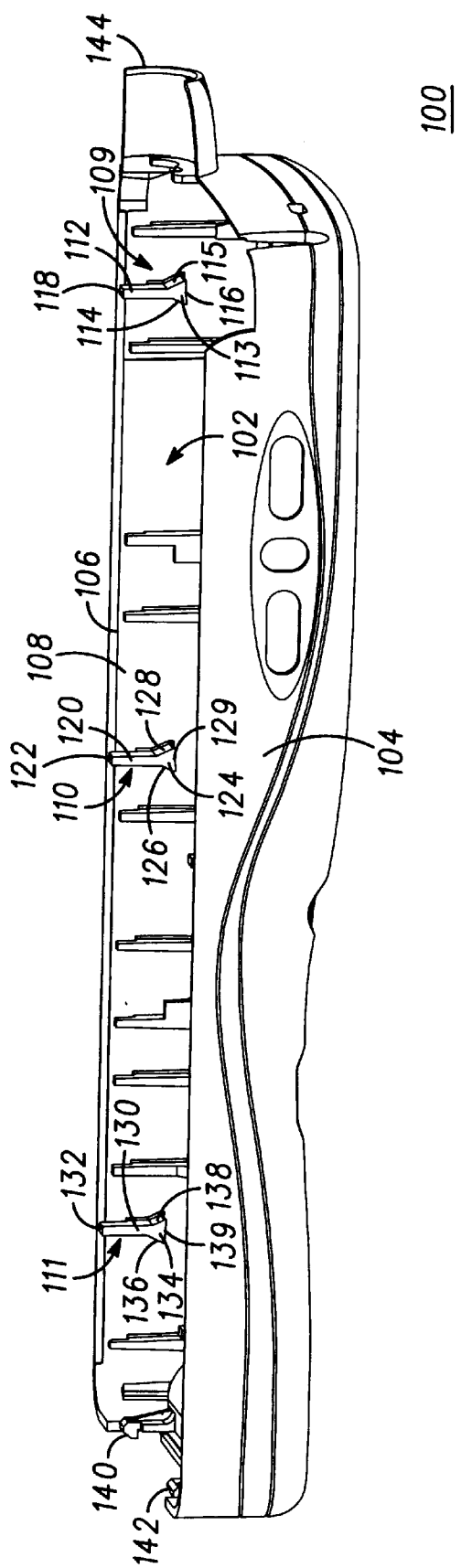
FIG. 1 is a perspective view of a front housing showing protrusions in the front housing side wall according to the present invention.

Turning first to FIG. 1, the perspective view of the 100 of the front housing shows a recess 102 surrounded by walls 104 and 106. Also visible is an inner wall 108 having protrusions 109, 110, and 111. Protrusion 109 preferably includes a base portion 112 extending to a flared portion 113 having angled edges 114 and 115 extending to an end surface 116. Protrusion 109 further includes an end surface 118 at the opposite end of the protrusion. Protrusion 110 also includes a base portion 120 extending from an end surface 122 to a flared portion 124. Flared portion 124 includes angled edges 126 and 128 extending to an end surface 129. Finally, protrusion 111 includes a base portion 130 extending from an end surface 132 to a flared portion 134. Flared portion 134 includes angled edges 136 and 138 which extend to an end surface 139. Bottom snaps 140 and 142 and an antenna cover 144 are also included on the front housing. The functions of end surfaces and flared portions of the protrusions will be described in more detail in the remaining figures. Also, protrusions are preferably included on the inner portion of wall 104. Although only three protrusions are shown on the visible inside wall, any number of protrusions could be incorporated according to the present invention.

Figure 2:
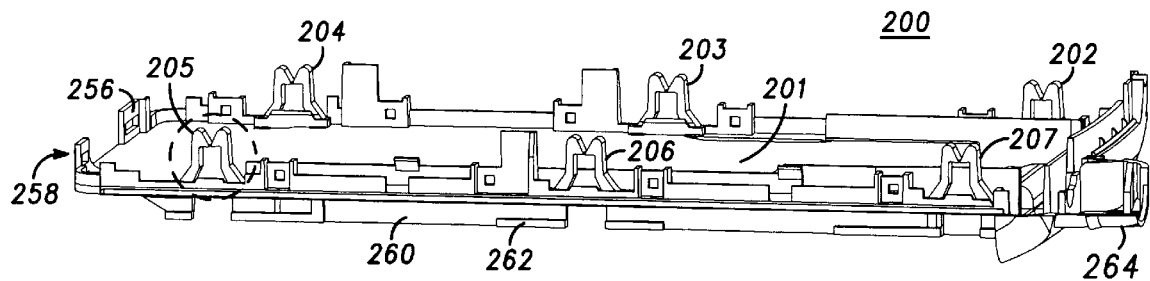
FIG. 2 is a perspective view of a rear housing showing snap hooks according to the present invention.
Figure 3:
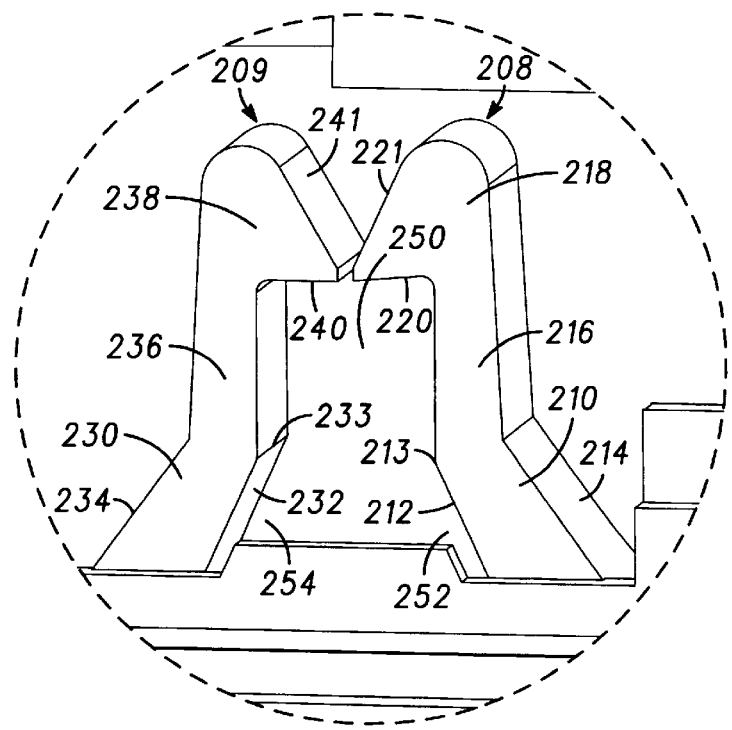
FIG. 3 is an enlarged view showing the snap hooks of FIG. 2 according to the present invention.

Turning now to FIG. 2, a perspective view shows a rear housing 200 incorporating the snaps of the present invention. In particular, the rear housing generally comprises a flat surface 201 having projections comprising snaps 202 through 207. Preferably, the snaps comprise two opposing snap hooks. As shown in more detail in the enlarged portion of FIG. 2, snap 205 preferably comprises opposing snap hooks 208 and 209. Snap hook 208 comprises an inclined portion 210 having an inner edge 212 extending to an elbow 213, and an outer edge 214. Inclined portion 210 extends to a body portion 216 terminated at a flange 218 having a flange surface 220. Although body portion 216 is shown as a vertical member, other shapes of the inclined portion and body portion could be employed in the present invention. For example, the body portion could be curved or angled itself.

Snap hook 209 is preferably similarly designed, and includes an inclined portion 230 having an inner surface 232 extending to an elbow 233, and an outer surface 234. Inclined portion 230 extends to a body portion 236 which terminates at a flange 238 having a flange surface 240. The two opposing snap hooks preferably form a recess 250 having recesses 252 and 254 under inclined portions 210 and 230, respectively. As will be described in more detail in reference to the remaining figures, the cavities enable disassembly of the housing elements without damage to the snap hooks.

Also shown in FIG. 2 are apertures 256 and 258 for receiving bottom snaps 140 and 142 on the front housing. Also, rails 260 and flanges 262, which are generally adapted to receive a battery for the device, may be used to secure the device to a disassembling fixture, which will be described in more detail in the remaining figures.

Figure 4:
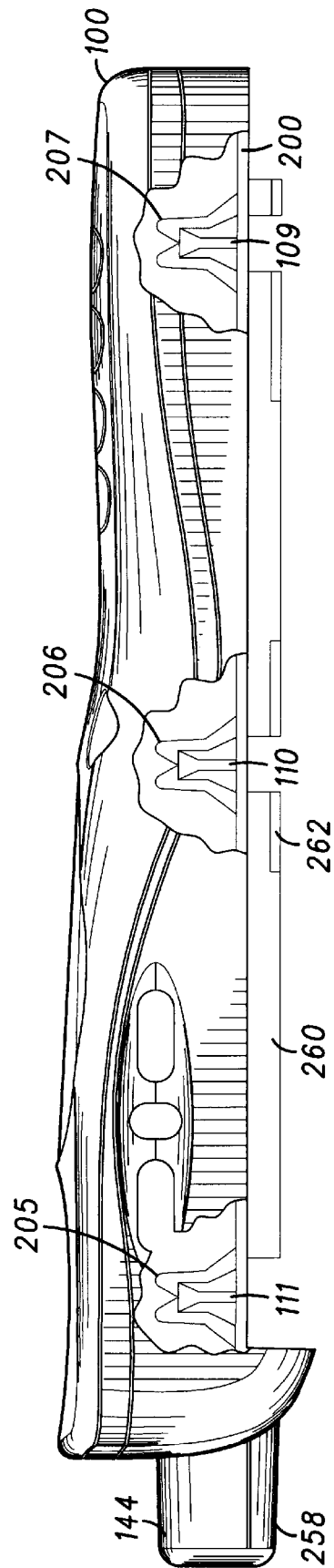
FIG. 4 is an elevational view showing the front and rear housings assembled according to the present invention.

Turning now to FIG. 4, cut-outs in an elevational view of the housing arrangement show the interlocking of the protrusions and snap hooks. As is apparent from FIG. 4, flanges 218 and 238 deflect away from one another as ramp edges 221 and 241 ride along angled edges 136 and 138 until flange surfaces 220 and 240 of the snap hooks clear end surface 139 of the protrusion.

Figure 5:
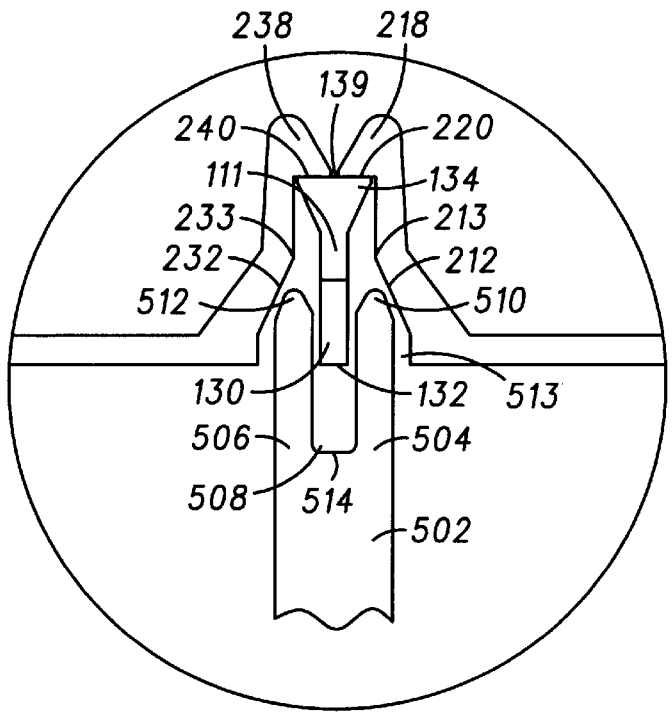
FIG. 5 is an elevational view showing a removal device inserted into the snap hook of the assembled housing at a first stage of disassembling according to the present invention.
Figure 6:
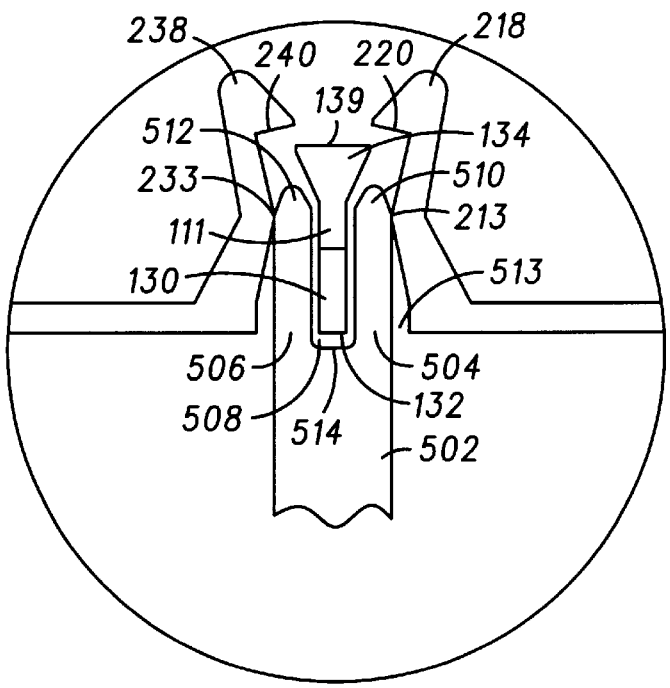
FIG. 6 is an elevational view of a removal device inserted into the snap hook of the assembled housing in a second stage of the disassembling according to the present invention.
Figure 7:
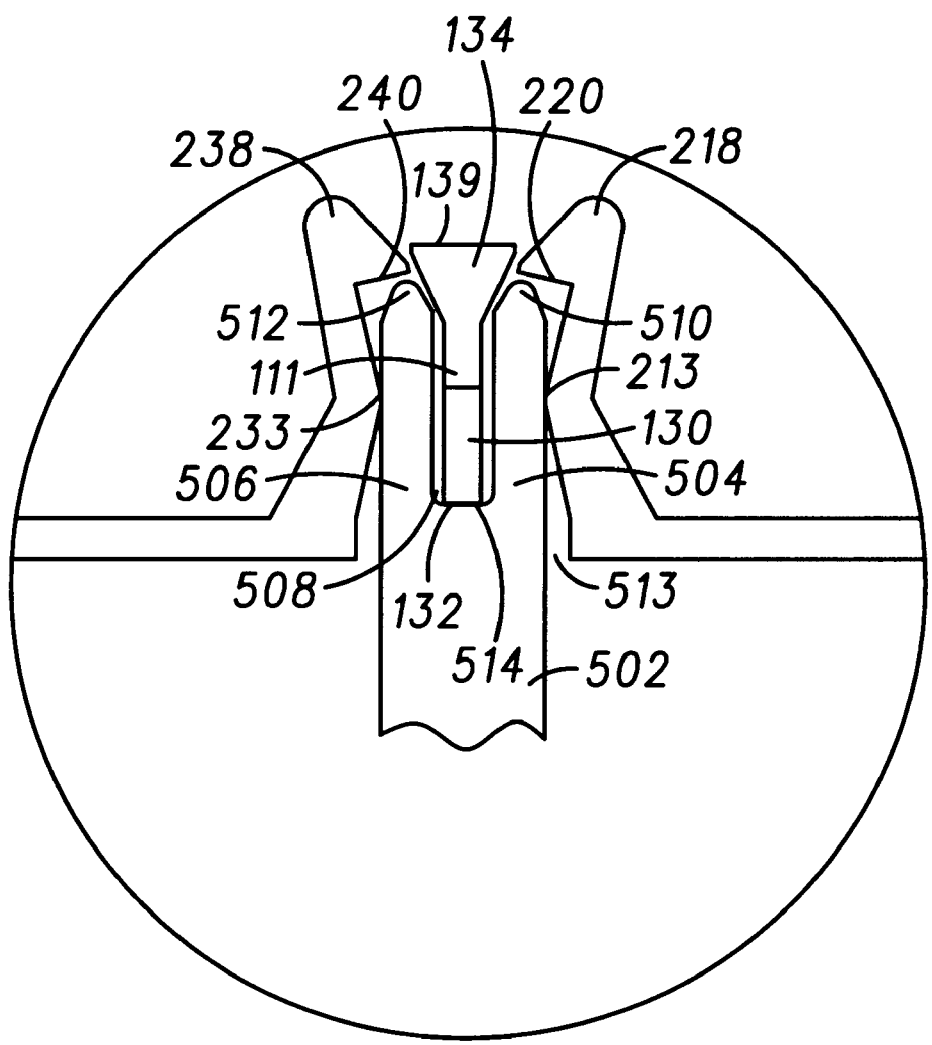
FIG. 7 is an elevational view of a removal device inserted into the snap hook of the assembled housing in a third stage of disassembling according to the present invention.

Turning now to FIGS. 5–7, the method for disassembling the front and rear housing according to the present invention is shown. The snap apparatus shown in the present disclosure allows a "U" shaped tool to disengage the front housing from the rear housing without damaging either housing. In particular, a removal tool 502 comprises fingers 504 and 506 creating a gap 508 and extending from a wall 514 to tapered ends 510 and 512, which are preferably tapered to minimize any damage to the housings. As shown in FIG. 5, the tapered ends 510 and 512 are positioned in recesses 252 and 254, respectively. The shape of the snap hooks is such that a removal tool of a certain width will force them apart to the deflection required for disassembly. As the removal tool is being inserted into a recess 513 in the rear housing, it deflects the opposing snaps apart. The amount of deflection is determined by the width of the tool and the angle of the snap arm.

As the fingers are advanced, as shown in FIG. 6, tapered ends 510 and 512 abut the inner surfaces 212 and 232, forcing flange portions 218 and 232 generally outward and disengaging flange surfaces 220 and 240 from end surface 139 of protrusion 111. The finger, having disengaged the snaps, can also be used to move and push the front housing apart from the rear. As can be seen in FIG. 6, as wall 514 approaches end surface 132, the tips of flange surfaces 220 and 240 have cleared end surface 139.

Once the full width of the tool has been inserted past elbows 213 and 233, the snaps are not deflected any further regardless of the motion of the tool. This enables the tool to continue moving the front housing apart from the rear without further deflecting the snap hooks. This ensures that the snap hooks are never overstressed, that the front housing comes completely off of the rear housing every time, and that repeated disassembly will only minimally affect the strength of the snaps. As can be seen in FIG. 7, as removal tool 502 is further advanced the tool drives the front housing away from the rear housing without further stress on the snap hooks. The elbows 213 and 233 merely ride along the edges of the fingers, while wall 514 advances the protrusions. Accordingly, the design minimizes the risk of damaging the snaps while removing the front housing from the rear housing.

Figure 8:
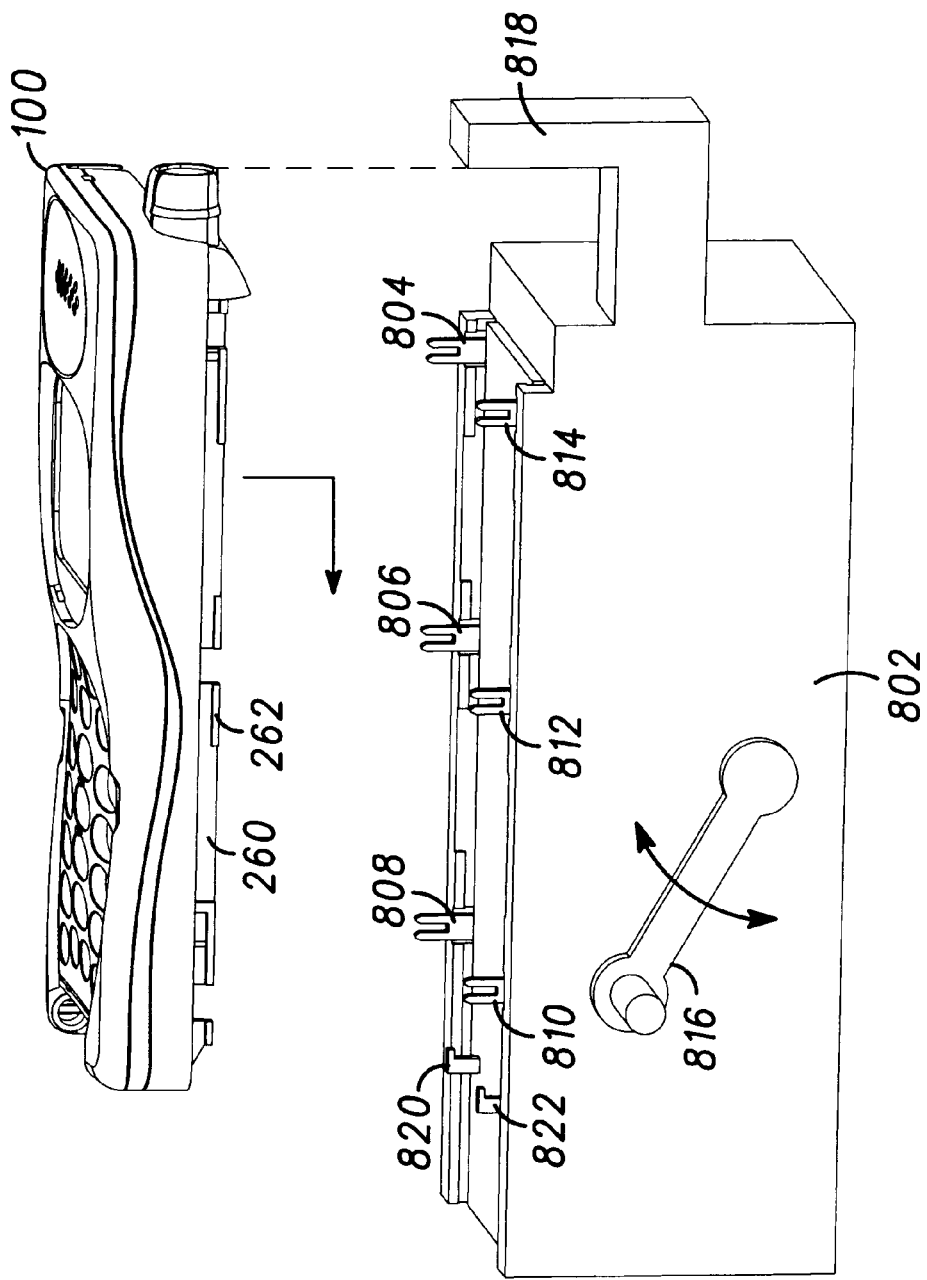
FIG. 8 is a perspective view showing a housing assembly and a disassembling tool for disassembling housings according to the present invention.

Turning now to FIG. 8, a disassembling tool having multiple removal tools is shown. In particular, disassembling tool 802 comprises removal tools 804 through 814. The removal tools are moved up and down by a lever 816. The disassembling device further preferably includes an antenna stop 818. The antenna stop ensures that the housing elements are properly inserted. That is, for a wireless communication device, it is important that the antenna is removed prior to insertion to prevent any damage to the antenna. If the antenna is still on the device, the device will not fit on the disassembling tool.

The device is inserted on the disassembling tool by aligning the end of the device with the antenna stop and sliding the device backward away from the antenna stop as shown by the arrow. Although a rigid antenna stop is shown, a spring loaded antenna stop could also be employed according to the present invention. Rails 260 and flanges 262 preferably interact with corresponding rails on the disassembling device to secure the housing to the disassembling device when it is moved into position. As the housing is moved as shown by the arrow, the projections 820 and 822 enter apertures 256 and 258, releasing bottom snaps 140 and 142 respectively. The protrusions along the rear edge were designed to allow projections 820 and 822 on the fixture to deflect the bottom snaps back, thereby releasing the front housing from the rear housing and allowing the front housing to be pushed up and off of the rear housing as the removal tools are moved upward.

Although the invention has been described and illustrated in the above description and drawings, it is understood that this description is by way of example only and that numerous changes and modifications can be made by those skilled in the art without departing from the true spirit and scope of the invention. For example, a single snap could be used in place of the two opposing snap hooks. Also, the snaps could be placed in another orientation, such as orthogonally to the snaps as shown. While the present invention is conveniently formed in plastic housings, the snaps could be formed of any material which has some flexablility, an could be attached to any housing, rather that formed in the housing. Although the present invention finds particular application in portable cellular radiotelephones, the invention could be applied to any wireless communication device, including pagers, electronic organizers, or computers, or any two objects which could be connected by such a snap. Applicants' invention should be limited only by the following claims.

We claim:

1. A snap apparatus for connecting a front housing and a rear housing, the snap apparatus comprising:

on the rear housing, a base having a first snap hook opposing a second snap hook,
wherein the first snap hook comprises,
a first inclined portion coupled to the base,
a first body portion coupled to the first inclined portion at a first elbow, and
a first flange coupled to the first body portion,
wherein the second snap hook comprises,
a second inclined portion coupled to the base,
a second body portion coupled to the second inclined portion at a second elbow, and
a second flange coupled to the second body portion,
wherein the first snap hook and the second snap hook form a gap between the first body portion and the second body portion, the gap expanding into a recess below the first inclined portion and the second inclined portion;

on the front housing, a protrusion extending from a first end surface to a second end surface,
wherein the protrusion has an outside dimension smaller than the recess,
wherein the protrusion is positioned inside the gap with the second end surface contacting the first and second flanges when the front housing and the rear housing are connected; and wherein the recess extends through the base for receiving a removal tool when the front housing is disconnected from the rear housing, the removal tool having a finger extending from a wall to a tapered end and positioned between the protrusion and at least one of the snap hooks, the finger deflecting the flange portion of the at least one snap hook outward to disengage the flange portion of the at least one snap hook from the second end surface as the tapered end is advanced along the elbow of the at least one snap hook, and wherein, when the tapered end is inserted past the elbow, the at least one snap hook is not further deflected outward and the wall of the removal tool is engaged against the first end surface of the protrusion to drive the front housing away from the rear housing.

2. The snap apparatus of claim 1,
wherein the first inclined portion comprises a first inner surface leading to the first elbow; and
wherein the second inclined portion comprises a second inner surface leading to the second elbow.

3. The snap apparatus of claim 2,
wherein the first inclined portion is flexible to allow the first flange to deflect when pressure is applied to the first inner surface of the first inclined portion; and
wherein the second inclined portion is flexible to allow the second flange to deflect when pressure is applied to the second inner surface of the second inclined portion.

4. A snap apparatus for connecting a front housing and a rear housing, the snap apparatus comprising:
on the rear housing,
a plurality of snaps having opposing snap hooks coupled to a base, each opposing snap hook having an inclined portion coupled to the base, a body portion coupled to the inclined portion at an elbow, and a flange coupled to the body portion,
wherein each snap forms a gap between the body portions of the opposing snap hooks, each gap expanding into a recess below the inclined portions;
on the front housing,
a plurality of protrusions corresponding to the plurality of snaps and extending from a wall of the front housing, each protrusion of the plurality of protrusions having a surface for receiving the flange when the front housing is connected to the rear housing, wherein the protrusions have outside dimensions smaller than the recesses, and wherein the protrusions are positioned inside the gaps when the front housing is connected to the rear housing, and wherein the recesses extend through the base for receiving a removal tool when the front housing is disconnected from the rear housing, the removal tool having a finger extending from a wall to a tapered end, and positioned between the protrusions and at least one of the opposing snap hooks, the finger deflecting the flange portion of the at least one opposing snap hook outward to disengage the flange portion from the second end surface as the tapered end is advanced along the elbow of the at least one opposing snap hook, and wherein, when the tapered end is inserted past the elbow, the at least one opposing snap hook is not further deflected outward and the wall of the removal tool is engaged against the first end surface of the corresponding protrusion to drive the front housing away from the rear housing.

* * * * *